(12) United States Patent
Hirokami et al.

(10) Patent No.: US 11,279,718 B2
(45) Date of Patent: Mar. 22, 2022

(54) METHOD FOR PRODUCING UREIDO GROUP-CONTAINING ORGANOSILICON COMPOUND

(71) Applicant: Shin-Etsu Chemical Co., Ltd., Tokyo (JP)

(72) Inventors: Munenao Hirokami, Annaka (JP); Katsuhiro Uehara, Tokyo (JP); Toru Iijima, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 73 days.

(21) Appl. No.: 16/573,514

(22) Filed: Sep. 17, 2019

(65) Prior Publication Data

US 2020/0087327 A1 Mar. 19, 2020

(30) Foreign Application Priority Data

Sep. 18, 2018 (JP) .............................. JP2018-173677

(51) Int. Cl.
*C07F 7/10* (2006.01)
(52) U.S. Cl.
CPC ...................... *C07F 7/10* (2013.01)
(58) Field of Classification Search
None
See application file for complete search history.

(56) References Cited

FOREIGN PATENT DOCUMENTS

| CN | 104262382 A | 1/2015 |
|----|-------------|--------|
| CN | 104628760 A | 5/2015 |
| DE | 10 2006 018 500 A1 | 8/2007 |
| EP | 0 276 860 A2 | 8/1988 |
| JP | 63-188688 A | 8/1988 |

OTHER PUBLICATIONS

CN-104262382 machine translation from Google Patents, downloaded Jan. 25, 2021.*

* cited by examiner

*Primary Examiner* — Clinton A Brooks
(74) *Attorney, Agent, or Firm* — Birch, Stewart, Kolasch & Birch, LLP

(57) ABSTRACT

A method for producing an ureido group-containing organosilicon compound includes the following steps (I) and (II):
(I): a step of obtaining a compound represented by formula (1) by reacting urea and an amino group-containing organosilicon compound represented by formula (3):

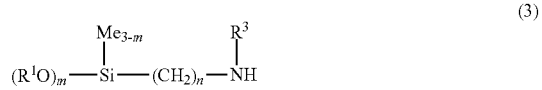

wherein $R^1$ represents an alkyl group having 1 to 10 carbon atoms or the like, $R^3$ represents a hydrogen atom or the like, Me represents a methyl group, m represents an integer of 1 to 3, and n represents an integer of 1 to 12,

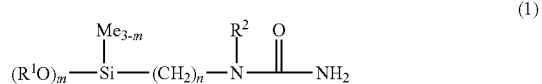

wherein $R^2$ represents a hydrogen atom or the like, and $R^1$, Me, m, and n represent the same meaning as described above; and
(II): a step of further reacting by supplying the amino group-containing organosilicon compound represented by formula (3) to a mixture containing a compound represented by formula (1) and urea.

5 Claims, No Drawings

METHOD FOR PRODUCING UREIDO GROUP-CONTAINING ORGANOSILICON COMPOUND

CROSS-REFERENCE TO RELATED APPLICATION

This non-provisional application claims priority under 35 U.S.C. § 119(a) on Patent Application No. 2018-173677 filed in Japan on Sep. 18, 2018, the entire contents of which are hereby incorporated by reference.

TECHNICAL FIELD

The present invention relates to a method for producing an ureido group-containing organosilicon compound.

BACKGROUND ART

In the related art, an ureido group-containing organosilicon compound represented by 3-ureidopropyl triethoxy silane has been widely used as an inorganic surface treatment agent and an adhesion aid of a composition.

As the method for producing an ureido group-containing organosilicon compound, a method for reacting an amino group-containing organosilicon compound with urea (Patent Documents 1 to 4) has been known, and the ureido group-containing organosilicon compound obtained by this method has an advantage of excellent quality from the viewpoint that the content of carbamic acid ester compounds which are impurities is small, and a metal catalyst is not contained.

However, in the producing methods according to Patent Documents 1 to 4, the amino group-containing organosilicon compound and the urea are collectively charged to react with each other, and thereby it is difficult to control the amount of ammonia gas generated, which causes a problem of a high risk during production.

CITATION LIST

Patent Document 1: JP-B S63-188688
Patent Document 2: DE-A 102006018500
Patent Document 3: CN-A 104262382
Patent Document 4: CN-A 104628760

SUMMARY OF THE INVENTION

The present invention is made in consideration of the above circumstances, and an object thereof is to provide a method for producing an ureido group-containing organosilicon compound from an amino group-containing organosilicon compound and urea, a safe producing method in which the amount of ammonia gas generated can be controlled.

As a result of intensive studies to achieve the above object, the present inventors have found that the amount of ammonia gas generated can be controlled by reacting a small amount of amino group-containing organosilicon compound with urea in advance, and then reacting the remaining amino group-containing organosilicon compound with urea, or by performing a reaction by adding an ureido group-containing organosilicon compound to a reaction system of the amino group-containing organosilicon compound and urea, and thus completed the present invention.

That is, the present invention is to provide,
1. A method for producing an ureido group-containing organosilicon compound, including:
adding a compound represented by the following formula (1) when reacting urea with an amino group-containing organosilicon compound represented by the following formula (3):

wherein, $R^1$ each independently represents an alkyl group having 1 to 10 carbon atoms or an aryl group having 6 to 10 carbon atoms, and $R^3$ represents a hydrogen atom, an alkyl group having 1 to 10 carbon atoms, or a functional group represented by the following formula (4),

(asterisk * represents a bond to an adjacent atom, and p represents an integer of 1 to 12), Me represents a methyl group, m represents an integer of 1 to 3, and n represents an integer of 1 to 12,

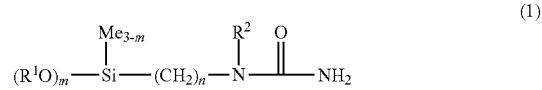

wherein, $R^2$ represents a hydrogen atom and an alkyl group having 1 to 10 carbon atoms or a functional group represented by the following formula (2),

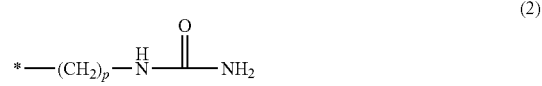

(asterisk * and p have the same meaning as described above), and $R^1$, Me, m, and n represent the same meaning as described above.
2. A method for producing an ureido group-containing organosilicon compound including:
the following steps (I) and (II),
(I): a step of obtaining a compound represented by the following formula (1) by reacting urea and an amino group-containing organosilicon compound represented by the following formula (3); and
(II): a step of reacting the amino group-containing organosilicon compound represented by the following formula (3) with urea by further supplying the amino group-containing organosilicon compound represented by the following formula (3) to a mixture containing the compound represented by the following formula (1) and urea:

wherein, $R^1$ each independently represents an alkyl group having 1 to 10 carbon atoms or an aryl group having 6 to 10 carbon atoms, and $R^3$ represents a hydrogen atom, an alkyl group having 1 to 10 carbon atoms, or a functional group represented by the following formula (4), $$*-(CH_2)_p-NH_2 \quad (4)$$

(asterisk * represents a bond to an adjacent atom, and p represents an integer of 1 to 12.), Me represents a methyl group, m represents an integer of 1 to 3, and n represents an integer of 1 to 12,

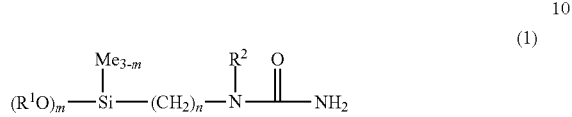
(1)

wherein, $R^2$ represents a hydrogen atom, an alkyl group having 1 to 10 carbon atoms or a functional group represented by the following formula (2),

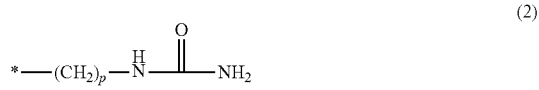
(2)

(asterisk * and p have the same meaning as described above), and $R^1$, Me, m, and n represent the same meaning as described above.
3. The method for producing an ureido group-containing organosilicon compound according to 2, wherein the step (II) is performed after reacting 50% by mol or more of the amino group-containing organosilicon compound represented by the above-described formula (3) in the step (I).
4. The method for producing an ureido group-containing organosilicon compound according to 1 or 2, further including adding alcohol.
5. The method for producing an ureido group-containing organosilicon compound according to 4, wherein an additional amount of the alcohol is 0.1% to 10% by weight per the entire reaction mixture.
6. The method for producing an ureido group-containing organosilicon compound according to any one of 1 to 5, wherein the amino group-containing organosilicon compound represented by the above-described formula (3) is represented by the following formula (10):

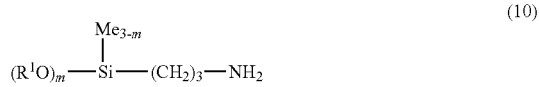
(10)

wherein, $R^1$, Me, and m have the same meaning as described above.
7. The method for producing an ureido group-containing organosilicon compound according to any one of 1 to 5, wherein the amino group-containing organosilicon compound represented by the above-described formula (3) is represented by the following formula (11):

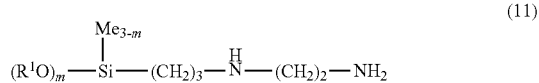
(11)

wherein, $R^1$, Me, and m have the same meaning as described above.

Advantageous Effects of the Invention

According to the producing method of the present invention, in the reaction between an amino group-containing organosilicon compound and urea, it is possible to control the amount of ammonia gas generated to safely obtain an ureido group-containing organosilicon compound.

DESCRIPTION OF THE PREFERRED EMBODIMENT

Hereinafter, the present invention is specifically described.

A method for producing an ureido group-containing organosilicon compound of the present invention includes adding a compound represented by the following formula (1) at the time of reacting an amino group-containing organosilicon compound represented by the following formula (3) and urea with each other.

That is, in the reaction between the urea and the amino group-containing organosilicon compound represented by formula (3), since the urea is hardly dissolved in the amino group-containing organosilicon compound represented by formula (3), the reactivity is low, and thereby it is difficult to control the amount of ammonia gas generated by the reaction. In this regard, by adding the ureido group-containing organosilicon compound represented by the above-described formula (1) to the above-described reaction system (by reacting the respective compounds in the presence of the ureido group-containing organic compound), the present compound functions as a compatibilizer to increase solubility of urea so that the reactivity between the urea and the amino group-containing organosilicon compound represented by formula (3) is increased, and thereby the amount of ammonia gas generated can be easily controlled.

(3)

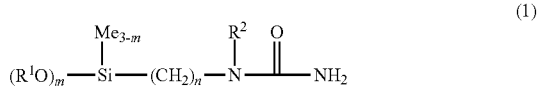
(1)

In the above-described formulae (1) and (3), $R^1$ each independently represents an alkyl group having 1 to 10 carbon atoms or an aryl group having 6 to 10 carbon atoms. The alkyl group having 1 to 10 carbon atoms may be linear, cyclic or branched, and specific examples thereof include a methyl group, an ethyl group, an n-propyl group, an i-propyl group, an n-butyl group, an s-butyl group, a t-butyl group, an n-pentyl group, an n-hexyl group, an n-heptyl group, an n-octyl group, an n-nonyl group, an n-decyl group, a cyclopropyl group, a cyclobutyl group, a cyclopentyl group, a cyclohexyl group, a cycloheptyl group, and a cyclooctyl group.

Specific examples of the aryl group having 6 to 10 carbon atoms include a phenyl group, an α-naphthyl group, and a (β-naphthyl group. Among them, $R^1$ is preferably a linear alkyl group is preferable and is more preferably a methyl group and an ethyl group.

In addition, in the above-described formulae (1) and (3), m represents an integer of 1 to 3, and preferably is an integer 2 or 3, n represents an integer of 1 to 12, and is preferably an integer of 1 to 8, and is more preferably 3, from the viewpoint of raw material procurement.

In the above-described formula (1), $R^2$ represents a hydrogen atom, an alkyl group having 1 to 10 carbon atoms, and a functional group represented by the following formula (2), and as the alkyl group having 1 to 10 carbon atoms, the same ones as a group exemplified by the above-described $R^1$, but a linear alkyl group is also preferable as $R^2$, and a methyl group and an ethyl group are more preferable.

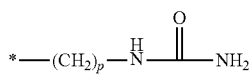

(2)

(asterisk * has the same meaning as described above.)

In the above-described formula (3), $R^3$ represents a hydrogen atom, an alkyl group having 1 to 10 carbon atoms, and a functional group represented by the following formula (4), and as the alkyl group having 1 to 10 carbon atoms, the same ones as a group exemplified by the above-described $R^1$, but a linear alkyl group is also preferable as $R^3$, and a methyl group and an ethyl group are more preferable.

*—$(CH_2)_p$—$NH_2$ (4)

(asterisk * has the same meaning as described above.)

In formulae (2) and (4), p represents an integer of 1 to 12, and from the viewpoint of availability of raw materials, an integer of 1 to 8 is preferable, and 2 is more preferable.

As specific examples of the compound represented by the above-described formula (1), compounds represented by the following formulae (5) to (9) can be exemplified; however, the examples are not limited thereto.

The compound represented by the above-described formula (1) may be the same as or may be different from the ureido group-containing organosilicon compound obtained by the reaction between the amino group-containing organosilicon compound represented by the above-described formula (3) according to the producing method of the present invention and urea.

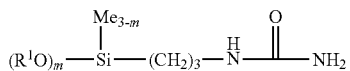

(5)

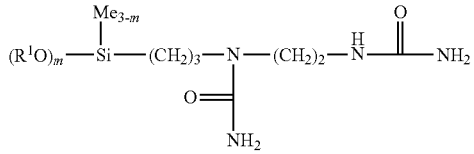

(6)

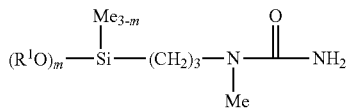

(7)

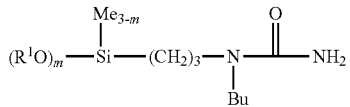

(8)

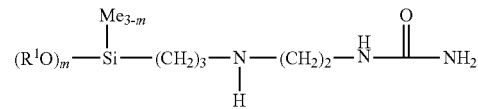

(9)

(wherein, $R^1$ and Me represent the same meaning as described above, and Bu means an n-butyl group.)

As specific examples of the amino group-containing organosilicon compound represented by the above-described formula (3), compounds represented by the following formulae (10) to (13) can be exemplified; however, the examples are not limited thereto.

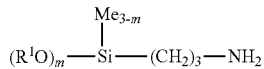

(10)

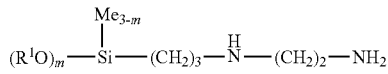

(11)

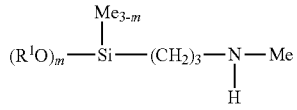

(12)

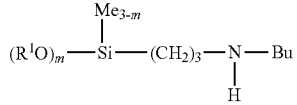

(13)

(wherein, $R^1$, Me and Bu represent the same meaning as described above.)

In the above producing method, the amount of urea used is preferably 0.4 to 1.5 mol, and is more preferably 0.9 to 1.1 mol, per 1 mol of amino group in the amino group-containing organosilicon compound represented by the above-described formula (3).

More specifically, it is preferably 0.9 to 1.1 mol per 1 mol of amino group-containing organosilicon compound represented by the above-described formula (10), and is preferably 1.8 to 2.2 mol per 1 mol of amino group-containing organosilicon compound represented by the above-described formula (11).

In addition, a reaction temperature is preferably 100° C. to 140° C., and is more preferably 100° C. to 120° C. from the viewpoint of productivity improvement and side reaction suppression.

As the added compound represented by the above-described formula (1), compounds previously produced by urea and the amino group-containing organosilicon compound represented by formula (3) may be used, or commercially available compounds may be used. The additional amount is preferably 5% to 50% by mol, and is more preferably 10% to 45% by mol, per the amino group-containing organosilicon compound represented by the above-described formula (3).

Note that, the compound represented by the above-described formula (1) is preferably present in the reaction system at the start of the reaction between urea and the amino group-containing organosilicon compound represented by formula (3), and particularly, it is preferably to perform the reaction by adding the amino group-containing organosilicon compound represented by the formula (3) after mixing the urea and the compound represented by the formula (1). In this case, the method for adding the amino group-containing organosilicon compound represented by the following formula (3) is preferably a method for continuously supplying at a constant speed by dropping or the like is preferable.

In the above-described producing method, adding alcohol is preferable, and by adding an alcohol, the compatibility of urea can be improved and the reactivity can be improved.

Specific examples of the alcohol include methanol, ethanol, and 2-propanol.

The additional amount of the alcohol is preferably 0.1% to 10% by weight per a total amount (the entire reaction mixture) of the amino group-containing organosilicon compound represented by the above-described formula (3) and urea. Within such a range, the compatibility of urea is improved and it is possible to suppress a temperature decrease in the reaction system by the presence of alcohol.

If necessary, after completion of the reaction, a concentration step under atmospheric pressure or reduced pressure and a filtration step may be performed, or a step of diluting an ureido group-containing organosilicon compound with alcohol may be performed.

The ureido group-containing organosilicon compound may be solidified, and also in this case, the handling property is improved by diluting the ureido group-containing organosilicon compound with alcohol to make it liquid.

Specific examples of the alcohol include the same as those described above.

In addition, the method for producing the ureido group-containing organosilicon compound of the present invention may include the following steps (I) and (II):

(I): Step of reacting urea with an amino group-containing organosilicon compound represented by the above-described formula (3) to obtain a compound represented by the above-described formula (1), and (II): Step of supplying an amino group-containing organosilicon compound represented by the above-described formula (3) to a mixture containing the compound represented by the above-described formula (1) and the urea, and reacting the resultant with urea.

Note that, unlike the method for reacting by continuously dropping amino group-containing organosilicon compound represented by the following formula (3), this method includes two or more steps of producing the compound represented by the above-described formula (1) by performing step (I), and then supplying the amino group-containing organosilicon compound represented by the following formula (3) to the obtained reaction solution again.

The step (I) is a step of reacting urea with an amino group-containing organosilicon compound represented by the above-described formula (3) to obtain a compound represented by the above-described formula (1). As described above, in the reaction between the urea and the amino group-containing organosilicon compound represented by the above-described formula (3), since the urea is hardly dissolved in the amino group-containing organosilicon compound represented by the above-described formula (3), the reactivity is low, and thereby it is difficult to control the amount of ammonia gas generated by the reaction. In this step, a part of the amino group-containing organosilicon compound is reacted in advance to form the ureido group-containing organosilicon compound represented by the above-described formula (1), and thus the present compound acts as a compatibilizer to increase the solubility of urea, and in step (II), the reactivity between urea and the amino group-containing organosilicon compound represented by the above-described formula (3) can be enhanced. With this, it is possible to immediately react the supplied amino group-containing organosilicon compound so that the amount of ammonia gas generated can be easily controlled.

In the above producing method, as the entire of steps (I) and (II), the amount of urea used is preferably 0.4 to 1.5 mol, and is more preferably 0.9 to 1.1 mol, per 1 mol of amino group in the amino group-containing organosilicon compound represented by the above-described formula (3).

More specifically, it is preferably 0.9 to 1.1 mol per 1 mol of amino group-containing organosilicon compound represented by the above-described formula (10), and is preferably 1.8 to 2.2 mol per 1 mol of amino group-containing organosilicon compound represented by the above-described formula (11).

In the reaction of step (I), the method for mixing urea and the amino group-containing organosilicon compound represented by the above-described formula (3) is not particularly limited, and a method for collectively charging both in a reactor is preferable.

The amount of the amino group-containing organosilicon compound represented by the above-described formula (3) used is preferably 5% to 50% by mol, and more preferably 10% to 45% by mol, per the entire amount of step (I) and step (II). Within such a range, the amount of ammonia gas generated by the reaction in this step does not become excessively large, and the reactivity between the urea and the amino group-containing organosilicon compound represented by the above-described formula (3) in step (II) can be enhanced.

The reaction temperature in step (I) is preferably 100° C. to 140° C., and is more preferably 100° C. to 120° C. from the viewpoint of productivity improvement and side reaction suppression.

In particular, it is preferable to perform step (II) after the reaction has progressed by 50% by mol or more in the amino group-containing organosilicon compounds represented by the above-described formula (3) used in step (I), and is more preferable to perform step (II) after the reaction has progressed by 80% by mol or more.

Further, in step (I), adding alcohol is preferable, and by adding an alcohol, the compatibility of urea can be improved and the reactivity can be improved.

Specific examples of the alcohol include methanol, ethanol, and 2-propanol.

The additional amount of the alcohol is preferably 0.1% to 10% by weight per a total amount (the entire reaction mixture) of the amino group-containing organosilicon compound represented by the above-described formula (3) and urea which are used in step (I).

Within such a range, the compatibility of urea is improved and it is possible to suppress a temperature decrease in the reaction system by the presence of alcohol.

Step (II) is a step of further supplying the remaining amino group-containing organosilicon compound represented by the above-described formula (3) to a mixture containing the compound represented by the above-described formula (1) and the urea, and reacting the resultant with urea.

The method for supplying the amino group-containing organosilicon compound represented by the following formula (3) is not particularly limited, and from the viewpoint of control of the amount of ammonia gas generated per unit time, it is preferable to use a method for continuously supplying at a constant speed by insertion into a solution, dropping, or the like, or a method for adding in multiple times.

In addition, in step (II), the time required for the supply of the amino group-containing organosilicon compound represented by the above-described formula (3) is preferably 5 to 30 hours, from the viewpoint of the amount of ammonia gas generated per unit time and the production efficiency.

Similar to the above-described step (I), the reaction temperature of step (II) is preferably 100° C. to 140° C., and is more preferably 100° C. to 120° C. from the viewpoint of productivity improvement and side reaction suppression.

If necessary, after completion of step (II), a concentration step under atmospheric pressure or reduced pressure and a filtration step may be performed, or a step of diluting an ureido group-containing organosilicon compound with alcohol may be performed.

The ureido group-containing organosilicon compound may be solidified, and also in this case, the handling property is improved by diluting the ureido group-containing organosilicon compound with alcohol to make it liquid.

Specific examples of the alcohol include the same as those described above.

EXAMPLES

Hereinafter, the present invention is more specifically described below with reference to Examples and Comparative Examples, but the present invention is not limited to these Examples.

Note that, in the following description, "parts" means parts by weight. The viscosity is a value measured at 25° C. using a rotational viscometer. A reaction rate was determined by $^1$H-NMR measurement, and the amount of ammonia gas generated was measured by a gas flow meter. In addition, the amount of carbamic acid ester by-produced was determined by gas chromatography (GC).

In addition, the following Examples and Comparative Examples are implemented by using 10 L separable flask scale, and in this scale, the amount of ammonia gas generated is preferably 40 L/H or less from the viewpoint of safety, and the amount of ammonia gas generated is more preferably 10 L/H or more from the viewpoint of productivity.

Example 1

901 g (15 mol) of urea and 996 g (4.5 mol) of 3-aminopropyl triethoxysilane (KBE-903, prepared by Shin-Etsu Chemical Co., Ltd.) were put in a 10 L separable flask equipped with a stirrer, a reflux condenser, a dropping funnel, and a thermometer, and the mixture was stirred at 117° C. for 20 hours. The reaction rate by $^1$H-NMR was 95% by mol. The amount of ammonia gas generated was 10 L/H at maximum.

Thereafter, 2,324 g (10.5 mol) of 3-aminopropyl triethoxysilane (KBE-903, prepared by Shin-Etsu Chemical Co., Ltd.) was added dropwise at 120° C. over 10 hours while stirring. After completion of the dropwise addition, stirring was performed at 117° C. for 5 hours. The reaction rate determined by $^1$H-NMR measurement was 100% by mol. The amount of ammonia gas generated was 30 L/H at maximum.

After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Example 2

901 g (15 mol) of urea, 996 g (4.5 mol) of 3-aminopropyl triethoxysilane (KBE-903, prepared by Shin-Etsu Chemical Co., Ltd.), and 120 g of ethanol were put in a 10 L separable flask equipped with a stirrer, a reflux condenser, a dropping funnel, and a thermometer, and the mixture was stirred at 120° C. for 10 hours. The reaction rate determined by $^1$H-NMR measurement was 95% by mol. The amount of ammonia gas generated was 20 L/H at maximum.

Thereafter, 2,324 g (10.5 mol) of 3-aminopropyl triethoxysilane (KBE-903, prepared by Shin-Etsu Chemical Co., Ltd.) was added dropwise at 120° C. over 10 hours while stirring. After completion of the dropwise addition, stirring was performed at 117° C. for 5 hours. The reaction rate determined by $^1$H-NMR measurement was 100% by mol. The amount of ammonia gas generated was 30 L/H at maximum.

After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Example 3

901 g (15 mol) of urea, 807 g (4.5 mol) of 3-aminopropyl trimethoxysilane (KBM-903, prepared by Shin-Etsu Chemical Co., Ltd.), and 80 g of methanol were put in a 10 L separable flask equipped with a stirrer, a reflux condenser, a dropping funnel, and a thermometer, and the mixture was stirred at 117° C. for 10 hours. The reaction rate determined by $^1$H-NMR measurement was 95% by mol. The amount of ammonia gas generated was 20 L/H at maximum.

Thereafter, 1,883 g (10.5 mol) of 3-aminopropyl trimethoxysilane (KBM-903, prepared by Shin-Etsu Chemical Co., Ltd.) was added dropwise at 120° C. over 10 hours while stirring. After completion of the dropwise addition, stirring was performed at 117° C. for 5 hours. The reaction rate determined by $^1$H-NMR measurement was 100% by mol. The amount of ammonia gas generated was 30 L/H at maximum.

After completion of the reaction, the reaction solution was evaporated under reduced pressure, cooled to 30° C., and filtered to obtain a colorless and transparent solution having a viscosity of 330 mm$^2$/s. The content of methyl carbamate was less than 0.1% by mol.

Example 4

1,201 g (20 mol) of urea, 667 g (3.0 mol) of N-2-(aminoethyl)-3-propy (KBM-603, prepared by Shin-Etsu Chemical Co., Ltd.), and 80 g of methanol were put in a 10 L separable flask equipped with a stirrer, a reflux condenser, a dropping funnel, and a thermometer, and the mixture was stirred at 117° C. for 15 hours. The reaction rate determined by $^1$H-NMR measurement was 95% by mol. The amount of ammonia gas generated was 20 L/H at maximum.

Thereafter, 1,557 g (7.0 mol) of N-2-(aminoethyl)-3-propy (KBM-603, prepared by Shin-Etsu Chemical Co., Ltd.) was added dropwise at 117° C. over 15 hours while stirring. After completion of the dropwise addition, stirring was performed at 120° C. for 5 hours. The reaction rate determined by $^1$H-NMR measurement was 100% by mol. The amount of ammonia gas generated was 30 L/H at maximum.

After completion of the reaction, the reaction solution was evaporated under reduced pressure, cooled to 50° C., 3,084 g of methanol was added dropwise, and the mixture was stirred at room temperature for 1 hour. After the stirring, the mixture was filtered to obtain a colorless and transparent solution having a viscosity of 2.1 mm$^2$/s. The content of methyl carbamate was less than 0.1% by mol.

Example 5

631 g (10.5 mol) of urea and 1,189 g (4.5 mol) of 3-ureidopropyl triethoxysilane were put in a 10 L separable flask equipped with a stirrer, a reflux condenser, a dropping funnel, and a thermometer, and 2,324 g (10.5 mol) of 3-aminopropyl triethoxysilane (KBE-903, prepared by Shin-Etsu Chemical Co., Ltd.) was added dropwise to the urea with stirring at 120° C. for 10 hours. After completion of the dropwise addition, stirring was performed at 117° C. for 5 hours. The reaction rate determined by $^1$H-NMR measurement was 100% by mol. The amount of ammonia gas generated was 30 L/H at maximum. After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Comparative Example 1

901 g (15 mol) of urea and 3,321 g (15 mol) of 3-aminopropyl triethoxysilane (KBE-903, prepared by Shin-Etsu Chemical Co., Ltd.) were put in a 10 L separable flask equipped with a stirrer, a reflux condenser, a dropping funnel, and a thermometer, and the mixture was stirred at 120° C. for 20 hours. The reaction rate determined by $^1$H-NMR measurement was 100% by mol. The amount of ammonia gas generated was 100 L/H at maximum.

After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Comparative Example 2

901 g (15 mol) of urea, 3,321 g (15 mol) of 3-aminopropyl triethoxysilane (KBE-903, prepared by Shin-Etsu Chemical Co., Ltd.), and 120 g of ethanol were put in a 10 L separable flask equipped with a stirrer, a reflux condenser, a dropping funnel, and a thermometer, and the mixture was stirred at 120° C. for 15 hours. The reaction rate determined by $^1$H-NMR measurement was 100% by mol. The amount of ammonia gas generated was 100 L/H at maximum.

After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Comparative Example 3

901 g (15 mol) of urea was put in a 10 L separable flask equipped with a stirrer, a reflux condenser, a dropping funnel, and a thermometer, and 3,321 g (15 mol) of 3-aminopropyl triethoxysilane (KBE-903, prepared by Shin-Etsu Chemical Co., Ltd.) was added dropwise to the urea with stirring at 117° C. for 10 hours. Thereafter, the mixture was stirred at 117° C. for 25 hours. The reaction rate determined by $^1$H-NMR measurement was 100% by mol. The amount of ammonia gas generated was 80 L/H at maximum.

After completion of the reaction, the reaction solution was evaporated under reduced pressure, cooled to 50° C., 4,000 g of methanol was added dropwise, and the mixture was stirred at room temperature for 1 hour. After the stirring, the mixture was filtered to obtain a colorless and transparent solution having a viscosity of 2.1 mm$^2$/s. The content of ethyl carbamate was less than 0.1% by mol.

Japanese Patent Application No. 2018-173677 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing an ureido group-containing organosilicon compound comprising:
following steps (I) and (II), (I): a step of obtaining a compound having a following formula (1) by reacting urea and an amino group-containing organosilicon compound having a following formula (3); and
(II): a step of reacting the amino group-containing organosilicon compound having the following formula (3) with urea by further supplying the amino group-containing organosilicon compound having the following formula (3) to a mixture obtained by the step (1) containing the compound having a following formula (1) and urea:

wherein, R$^1$ each independently represents an alkyl group having 1 to 10 carbon atoms or an aryl group having 6 to 10 carbon atoms, and R$^3$ represents a hydrogen atom, an alkyl group having 1 to 10 carbon atoms, or a functional group represented by a following formula (4),

(asterisk * represents a bond to an adjacent atom, and p represents an integer of 1 to 12.), Me represents a methyl group, m represents an integer of 1 to 3, and n represents an integer of 1 to 12,

wherein, $R^2$ represents a hydrogen atom, an alkyl group having 1 to 10 carbon atoms or a functional group represented by a following formula (2),

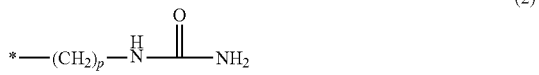

(2)

(asterisk * and p have the same meaning as described above), and Me, m, and n represent the same meaning as described above, wherein an amount of the amino group-containing organosilicon compound having the formula (3) used in the step (I) is 10% to 45% by mol based on a total amount of the amino group-containing organosilicon compound having the formula (3) used in the step (I) and the step (II), and a remaining amount of the amino group-containing organosilicon compound having the formula (3) is supplied in the step (II), and in the step (I), 50% by mol or more of the amino group-containing organosilicon compound having the above-described formula (3) used in the step (I) is reacted with the urea, before the remaining amount of the amino group-containing organosilicon compound having the formula (3) is supplied in the step (II).

2. The method for producing an ureido group-containing organosilicon compound according to claim 1, further comprising adding alcohol.

3. The method for producing an ureido group-containing organosilicon compound according to claim 2, wherein an additional amount of the alcohol is 0.1% to 10% by weight per the entire reaction mixture.

4. The method for producing an ureido group-containing organosilicon compound according to claim 1, wherein the amino group-containing organosilicon compound having the above-described formula (3) is an amino group-containing organosilicon compound having a following formula (10):

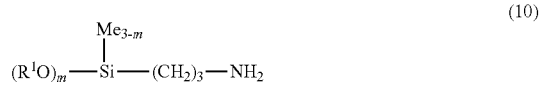

(10)

wherein, $R^1$, Me, and m have the same meaning as described above.

5. The method for producing an ureido group-containing organosilicon compound according to claim 1, wherein the amino group-containing organosilicon compound having the above-described formula (3) is an amino group-containing organosilicon compound having a following formula (11):

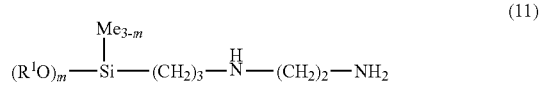

(11)

wherein, $R^1$, Me, and m have the same meaning as described above.

* * * * *